United States Patent
Meredith et al.

(10) Patent No.: US 10,873,857 B2
(45) Date of Patent: Dec. 22, 2020

(54) DYNAMIC WIRELESS LINK SECURITY

(71) Applicant: AT&T Intellectual Property I, L.P., Atlanta, GA (US)

(72) Inventors: Sheldon Meredith, Roswell, GA (US); William Cottrill, Canton, GA (US); Brandon Hilliard, Canton, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 212 days.

(21) Appl. No.: 15/994,484

(22) Filed: May 31, 2018

(65) Prior Publication Data
US 2019/0373470 A1    Dec. 5, 2019

(51) Int. Cl.
*H04W 12/08* (2009.01)
*H04L 29/12* (2006.01)
*H04L 29/06* (2006.01)

(52) U.S. Cl.
CPC ......... *H04W 12/08* (2013.01); *H04L 61/6022* (2013.01); *H04L 63/0428* (2013.01); *H04L 2209/80* (2013.01)

(58) Field of Classification Search
CPC ............. H04W 12/08; H04W 12/001; H04L 61/6022; H04L 63/0428; H04L 2209/80; H04L 63/105
See application file for complete search history.

(56) References Cited

U.S. PATENT DOCUMENTS

| | | | |
|---|---|---|---|
| 7,024,553 B1* | 4/2006 | Morimoto | H04L 9/0891 713/163 |
| 7,149,896 B1* | 12/2006 | Bahl | H04L 63/0428 713/166 |
| 7,761,553 B2 | 7/2010 | Melsen et al. | |
| 8,332,495 B2 | 12/2012 | Lancaster et al. | |
| 8,594,084 B2 | 11/2013 | Shuster | |
| 8,719,414 B2 | 5/2014 | Rooks et al. | |
| 8,769,061 B2 | 7/2014 | Lancaster et al. | |
| 8,854,966 B2 | 10/2014 | Fadell | |
| 2005/0091355 A1 | 4/2005 | Keohane et al. | |
| 2006/0101261 A1 | 5/2006 | Lee et al. | |
| 2009/0323608 A1* | 12/2009 | Adachi | H04W 28/20 370/329 |

(Continued)

FOREIGN PATENT DOCUMENTS

| | | |
|---|---|---|
| CN | 103974375 A | 8/2014 |
| CN | 106604402 A | 4/2017 |
| CN | 106793131 A | 5/2017 |

*Primary Examiner* — Meng Li
(74) *Attorney, Agent, or Firm* — Amin, Turocy & Watson, LLP

(57) ABSTRACT

Dynamic wireless link security can be used to connect a wireless computing device to a wireless network. A determination is made as to the minimum level of security required and a wireless communication channel corresponding to that level of security is selected from among multiple, available wireless communication channels with varying levels of security. At least one of the wireless communication channels is an unencrypted channel with access control, which can be used when information is already encrypted or when encryption is not needed due to low sensitivity of the information. The determination can be made with user input or by inspecting metadata in content to be sent over the wireless link.

14 Claims, 5 Drawing Sheets

(56) References Cited

U.S. PATENT DOCUMENTS

| | | | |
|---|---|---|---|
| 2011/0029437 A1* | 2/2011 | Lee | G06Q 20/3223 |
| | | | 705/72 |
| 2014/0155028 A1* | 6/2014 | Daniela | H04W 12/02 |
| | | | 455/411 |
| 2015/0215899 A1* | 7/2015 | Kumar | H04W 12/08 |
| | | | 455/59 |
| 2017/0238235 A1 | 8/2017 | Keidar et al. | |
| 2017/0272972 A1* | 9/2017 | Egner | H04L 47/2441 |

* cited by examiner

DYNAMIC WIRELESS LINK SECURITY

TECHNICAL FIELD

This disclosure generally relates to communication security for a wireless network, such as a wireless LAN that is used in a home or business. More specifically, this disclosure relates to security mechanisms that automatically change as needed to provide a necessary security level for the specific information being communicated while minimizing the use of bandwidth and computing resources.

BACKGROUND

Devices often connect to a wireless access point with standard security protocols such as WPA2 or WEP, which provide encryption over the wireless link. Often this connection is used to download information using secure http (https) port 443 for transmission. Secure http is widely accepted as providing encryption that is satisfactory for secure communication of banking and investment transactions, therefore the wireless link encryption provided by the wireless access point is adding encryption on top of already sufficient encryption. The added encryption takes additional bandwidth and processing power, and ultimately slows down the communication. The problem is exacerbated if the communication involves transmission of many web objects that must be independently acknowledged after each successful transfer.

Standard link encryption protocols provided by a wireless access point also provide access control and thus simply removing the link encryption without other controls would enable unwanted connections to the wireless network. The conflation of the need to encrypt the content and the need to encrypt for access control is therefore part of the problem. Unnecessary encryption is applied mainly to control access and secondarily because of a desire to secure content (which may already be secure). Techniques that are not encryption-based may be used for access control, for example, media access control (MAC) address filtering. Such techniques are often complex to set up and maintain because addresses must be reprogrammed whenever there is a change. Thus, link encryption is used for expedient and necessary access control, but at a substantial reduction in throughput.

SUMMARY

In one example, a system includes a wireless communication interface and a processor communicatively coupled to the wireless communication interface. The processor is configured to perform operations including determining a level of security required for a data communication link over a wireless communication channel between the wireless communication interface and a wireless computing device. The operations also include selecting the wireless communication channel corresponding to the level of security required from among multiple wireless communication channels with varying levels of security, wherein the wireless communication channels includes an unencrypted channel with access control. The operations also include establishing the data communication link over the wireless communication channel using the wireless communication interface.

In another example, a method includes connecting to a wireless access point using an encrypted channel, and determining a level of security required for a data communication link over a wireless communication channel to the wireless access point. The method also includes selecting the wireless communication channel corresponding to the level of security required from among multiple wireless communication channels with varying levels of security, wherein at least one of the wireless communication channels is an unencrypted channel with access control, and establishing the data communication link over the wireless communication channel.

In another example, a non-transitory computer-readable medium includes instructions that are executable by a computing device for causing the computing device to perform operations for accessing a wireless network. The operations include connecting to a wireless access point using an encrypted channel and determining a level of security required for a data communication link over a wireless communication channel to the wireless access point. The instructions also include selecting the wireless communication channel corresponding to the level of security required from among multiple wireless communication channels with varying levels of security, wherein at least one of the wireless communication channels is an unencrypted channel with access control, and establishing the data communication link over the wireless communication channel.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
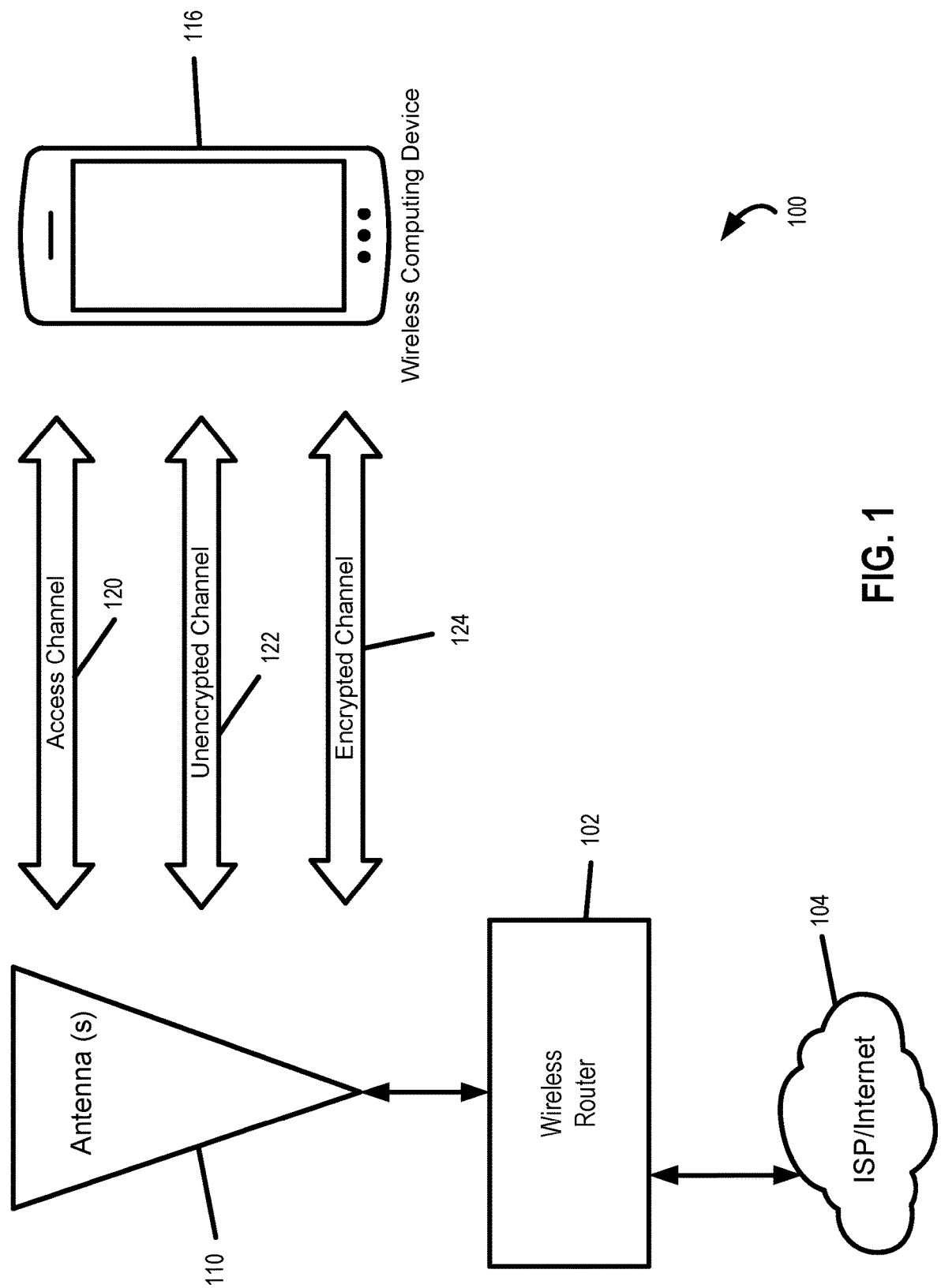
FIG. 1 is a block diagram depicting a system including dynamic wireless link security according to some aspects of the present disclosure.

Certain aspects of this disclosure relate to a wireless communications link for which the security protocol is dynamically and automatically applied based on a required security level, which can in turn be based on the security required for the information being transmitted. If the transmitted information is already sufficiently encrypted or does not require encryption, overhead connected with encryption may be reduced or removed entirely in order to minimize computer processing cost, bandwidth usage, and latency in the communications.

In one example, a wireless computing device connects to a wireless access point using an encrypted channel, and determines a level of security required for data communication over a wireless communication channel to the wireless access point. The wireless communication channel corresponding to the level of security required is selected from among multiple, available wireless communication channels with varying levels of security. At least one of the wireless communication channels is an unencrypted channel with access control, which can be used when information to be sent over the link is already encrypted or is not sensitive. In such a case, the use of an unencrypted channel results in faster throughput and fewer processor resources being used by the wireless computing device and the wireless access point. If instead a high security level is needed, a strongly encrypted channel from among the multiple available communication channels can be used.

In some aspects, a wireless data communication link is used in which access control is separated from communications security. Access control is ensured by all devices using an access channel that subject to secure encryption and passcode authentication just as is typically used with existing wireless networks. The encrypted access channel can be used to direct the connected wireless computing device to other channels for content transmission. The term "channel" herein can implicate any type of channelization, including, but not limited to frequency division, time division, or code division multiple access schemes. According to certain aspects, both wireless access point devices (such as routers) and wireless computing devices (such as smartphones) are able to access multiple simultaneous channels. The channels have varying degrees of encryption (including no encryption), depending the required security level, which is in turn dictated by what is being transmitted.

As an example, assume a word processing document has been passcode encrypted, is stored on a wireless computing device, and that the user of the wireless computing device wishes connect to the Internet and transmit the document somewhere. In this example, the metadata for the word processing file can announce the encryption status to any transmitting application installed on the wireless computing device. Even if the entire communications path were unencrypted, security is maintained at the endpoints due to the file-level encryption. At any possible point of interception in an unsecured communications path, security is still ensured. Similarly if the word processing file were unencrypted, but was sent with a mobile software application that creates an encrypted tunnel to a remote server, the word processing document is equally protected from snooping while traversing the unencrypted communication path. As another example, if neither the document nor a tunnel to a server were encrypted, but the internet protocol (IP) port being used to send the word processing document is port number 443, which invokes secured http ("https") protocol, there is similarly a mechanism to secure a Web service and communications therewith, so any added encryption at the wireless access point is unneeded and would serve to cause latency and a high use of processing power and energy.

In all of the above cases, an unencrypted wireless communication channel can be selected in order to gain speed and efficiency. Such an unencrypted wireless channel is still provided with some level of access control to prevent unwanted connections to the wireless network. The access control for the unencrypted channel can include, as an example, lightly encrypting packet headers based on some changing value, which will be discussed in further detail below.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

FIG. 1 depicts an example of a system 100 including dynamic wireless link security according to certain aspects of the present disclosure. System 100 includes wireless router 102 acting as a wireless access point. Wireless router 102 couples local wireless devices to an Internet service provider (ISP) 104 and ultimately to the Internet. Wireless router 102 is communicatively coupled to antenna or antennas 110 to provide a wireless link to a wireless computing device 116. The data communication link between wireless router 102 and wireless computing device 116 can be established over any of multiple wireless communication channels with varying levels of security. In system 100, these wireless communication channels include an encrypted access channel 120, an unencrypted channel 122, which is subject to access control despite the fact data traffic on channel 122 is unencrypted, and an encrypted channel 124.

Both access channel 120 and encrypted channel 124 are highly secured by encryption. If the wireless computing device 116 needs to send content over a high security communication channel, the wireless computing device can make use of the access channel 120 or be redirected to another wireless communication channel with strong encryption such as encrypted channel 124. If an encrypted channel is used, wireless router 102 sends the necessary encryption keys to wireless computing device 116 via the access channel 120. If a determination is made that the wireless computing device 116 is to send content over an unsecured data communication link, perhaps because the content is already secure, wireless computing device 116 can start with a seed MAC address and generate an IP header that is lightly encrypted based at least in part on the seed MAC address. The encryption of the IP headers is based on multiple MAC addresses over time as the rolling MAC address changes. Since a snooping device is not be aware of the seed MAC address or the polynomial for rolling the MAC address, a snooping device cannot directly mimic an authorized device such as wireless computing device 116.

A snooping device can "listen" on the unencrypted channel 122 and observe the MAC address at any instant in time, and perhaps attempt to interject messaging prior to the MAC address rolling to a new value. However, the light encryption of the IP headers make is very difficult to decipher any MAC address in time. For example, assume it takes one minute to decipher the MAC address and the MAC address rolls every 30 seconds. In such a case, no snooping device can present itself as an authorized device.

Communications over the unencrypted channel 122 is still subject to two levels of security automatically. The first level of security results from the fact that the a device needs to present an authorized MAC address that is the result of the seed and a rolling polynomial, both of which would be unknown except to an authorized device. The second level of security results from the fact that each IP header is lightly encrypted. In certain aspects, the vast majority of the content transmitted over the unencrypted channel has no security requirement either because the content simply does not need security or because the content has already been secured prior to transmission. Although system 100 is illustrated with three wireless communication channels, and number can be provided, including multiple secured channels with various levels of encryption. For example one channel can have 128-bit encryption while another channel can have 256-bit encryption.

Figure 2:
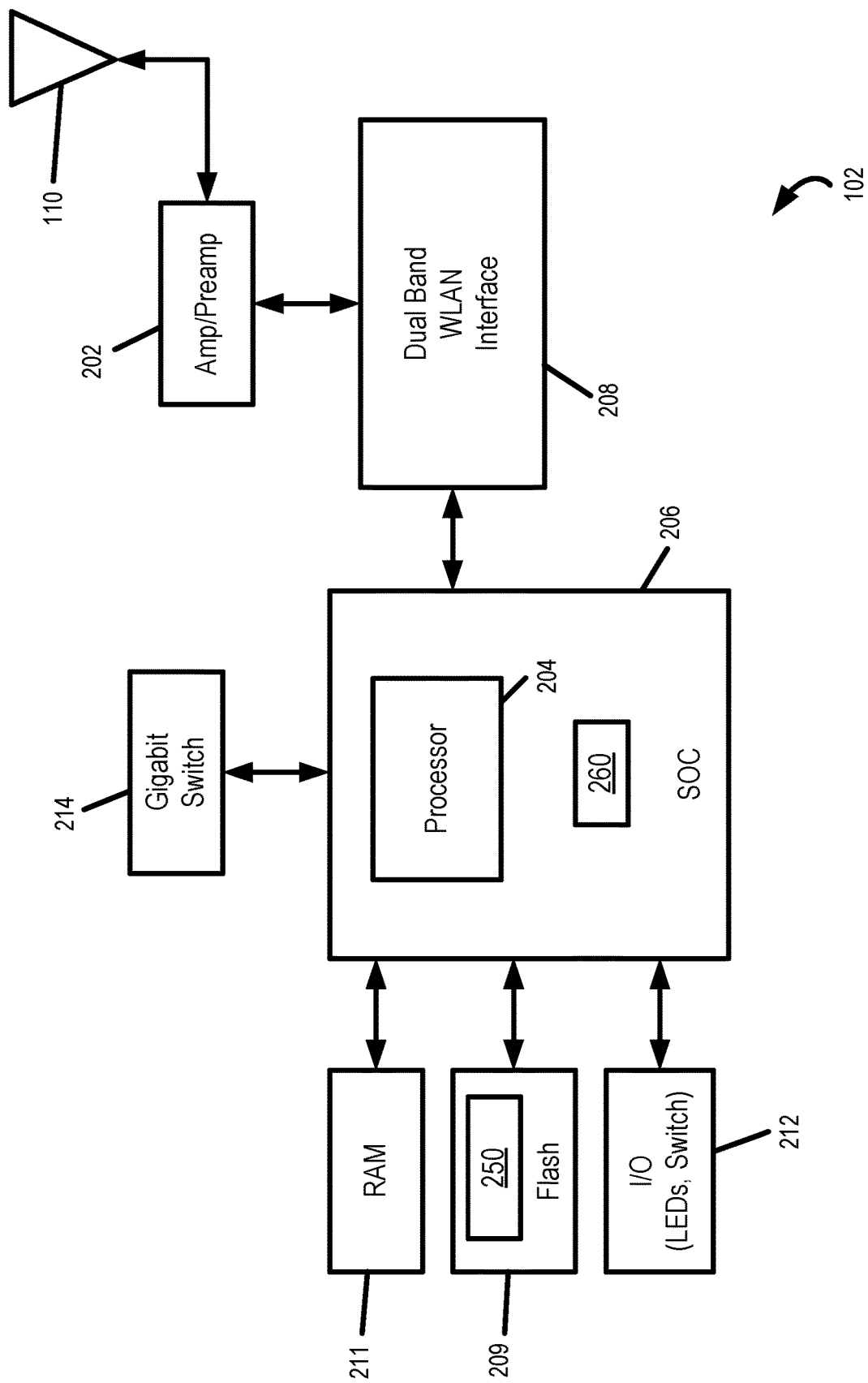
FIG. 2 is a block diagram depicting a router that provides dynamic wireless link security according to some aspects of the present disclosure.

FIG. 2 is a block diagram depicting the wireless router 102 that serves as a wireless access point and provides dynamic wireless link security according to certain aspects of the present disclosure. Router 102 includes an amplification block 202 connected to antenna 110. Amplification block 202 includes a power amplifier for Wi-Fi transmission, as well as preamplifiers or amplifiers for boosting received signals. Wireless router 102 also includes a processor 204, which is implemented as part of system-on-a-chip (SOC) 206. A dual-band wireless LAN (WLAN) interface block 208 is communicatively coupled to SOC 206. The dual-band WLAN interface supports the 2.4 GHz and the 5.8 GHz bands. Also included in wireless router 102 is flash storage 209 and random-access memory (RAM) 211. RAM 211 can include various devices and possibly memory dedicated to specific purposes such storing encryption keys, MAC addresses, and the like for access by processor 204 when the router is in operation. Input/output (I/O) block 212 drives status LEDs and received input from a switch, which usually takes the form of a button used for reset or status setting purposes. Within the dual band WLAN interface 208, the transmitted and received information can be converted to and from radio frequencies (RF), and filtering using baseband or intermediate frequency circuitry can be applied. The SOC 206 is specifically designed to implement routing functions over both wired and wireless connections, and also performs basic signal processing, e.g., synchronization, coding and decoding. Since wired connections are supported by wireless router 102, a gigabit Ethernet switch 214 is also included and communicatively coupled to SOC 206.

Still referring to FIG. 2, the functions of the SOC 206 and the other aforementioned blocks can be directed and controlled by the processor 204, which can be a general-purpose microprocessor, digital signal processor (DSPs), application specific integrated circuit (ASIC). Supporting control logic can include various types of signal conditioning circuitry, including analog-to-digital converters, digital-to-analog converters, input/output buffers, etc. The flash storage 209 shown in FIG. 2 includes at least one array of non-volatile memory cells. RAM 211 includes at least one array of dynamic random-access memory (DRAM) cells. The content of the flash memory may be pre-programmed and write protected thereafter, whereas the content of other portions of the RAM may be selectively modified and/or erased. The flash memory therefore, is non-transitory computer-readable medium that is used to store operating system software or firmware, including computer program code instructions 250, which are executable by processor 204 to carry out the dynamic wireless link security as described herein. Flash storage 209 can also be used to store credentials and encryption keys for longer periods. SOC 206 also contains on-board memory 260 that can serve as a non-transitory medium to store computer program code, credentials, MAC addresses, encryption keys, etc. It cannot be overemphasized that wireless router 102 is but one example of a wireless access point. For example, some wireless access points do not provide as many functions as a router and may not include wired LAN functionality.

Figure 3:
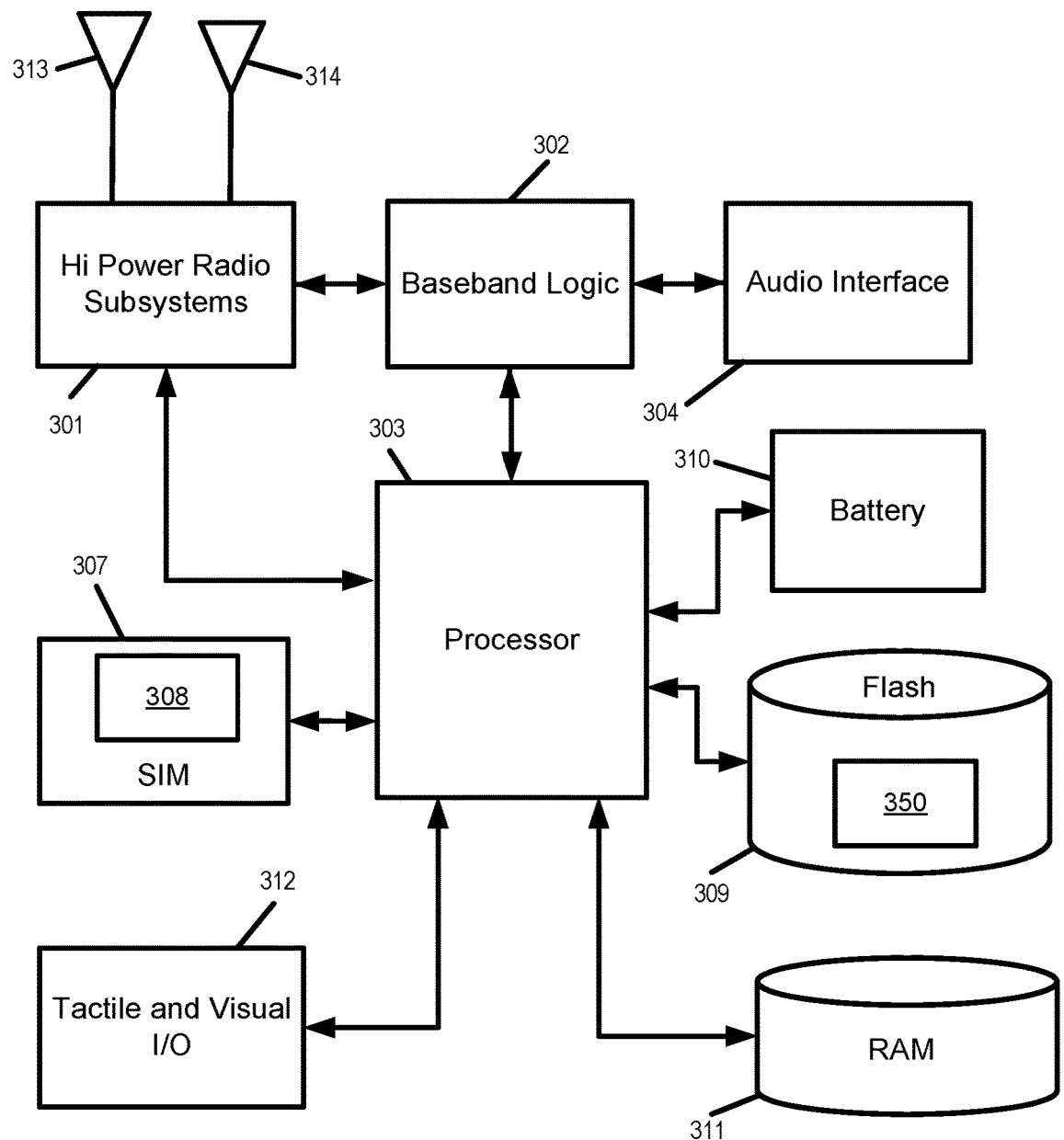
FIG. 3 is a block diagram depicting a mobile computing device that implements dynamic wireless link security according to some aspects of the present disclosure.

FIG. 3 is a block diagram depicting the wireless computing device 116 that implements dynamic wireless link security according to some aspects of the present disclosure. The computing device 116 includes a high power (hi power) radio subsystems block 301, a baseband logic block 302, a processor 303, and an audio interface block 304. A subscriber identity module (SIM) 307 is shown as operatively connected to the processor. Credentials and encryption keys 308 can be stored in SIM 308. Also included in computing device 116 is flash storage 309, a battery 310, and random-access memory (RAM) 311. The RAM 311 can include various devices and possibly memory dedicated to specific purposes such as graphics. A portion of RAM 311 can be used to store the data currently being viewed on the display of the computing device. The display (not shown) is part of tactile and visual input/output (I/O) block 312. Within the high power radio subsystems block 301, the transmitted and received information is converted to and from the radio frequencies (RF) of the various carrier types, and filtering using baseband or intermediate frequency circuitry is applied. Radio subsystems for Wi-Fi local area network communication are included in this block. The device's main antenna system 313 is connected to the radio subsystems block 301. The device also includes a Wi-Fi antenna 314. In the baseband logic block 302, basic signal processing occurs, e.g., synchronization, channel coding, decoding and burst formatting.

Still referring to FIG. 3, the audio interface block 304 handles voice as well as analog-to-digital (A/D) and D/A processing. It also produces output through a speaker (not shown). The processor 303 and supporting control logic (not shown) coordinates the aforementioned blocks. The functions of the aforementioned blocks are directed and controlled by the main processor, which can be a general-purpose microprocessor, digital signal processor (DSPs), application specific integrated circuit (ASIC). Supporting control logic can include various types of signal conditioning circuitry, including analog-to-digital converters, digital-to-analog converters, input/output buffers, etc.

The flash storage 309 shown in FIG. 3 includes at least one array of non-volatile memory cells. RAM 311 includes at least one array of dynamic random-access memory (DRAM) cells. The content of the flash memory may be pre-programmed and write protected thereafter, whereas the content of other portions of the RAM may be selectively modified and/or erased. The flash memory therefore, is non-transitory computer-readable medium that is used to store operating system software and application programs (apps), including computer program code instructions 350, which are executable by computing device 116 to carry out the dynamic wireless link security as described herein. RAM may be used to temporarily store code, a MAC address, a seed value, credentials, encryption keys, or other data. Flash storage 309 can also be used instead of the SIM 307 to store credentials and encryption keys for longer periods. For example, if a mobile computing device is not a smartphone, but rather a tablet computer, a SIM might not be present, in which case flash storage can be used, A memory device storing computer program code instructions executable by the processing device can include any type of memory device that retains stored information when powered off. A computer-readable medium can include electronic, optical, magnetic, or other storage devices capable of providing the processing device with computer-readable instructions or other program code. Such a medium may store the instructions on a server prior to installation in or programming of a proximity-based security mechanism. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. Appropriate computer program code instructions can implement dynamic wireless link security as described herein on any type of wireless computing device, including but not limited to a notebook computer, desktop computer, wearable computer, or tablet computer, in additional to a mobile device as shown in FIG. 3 such as a smartphone.

Figure 4:
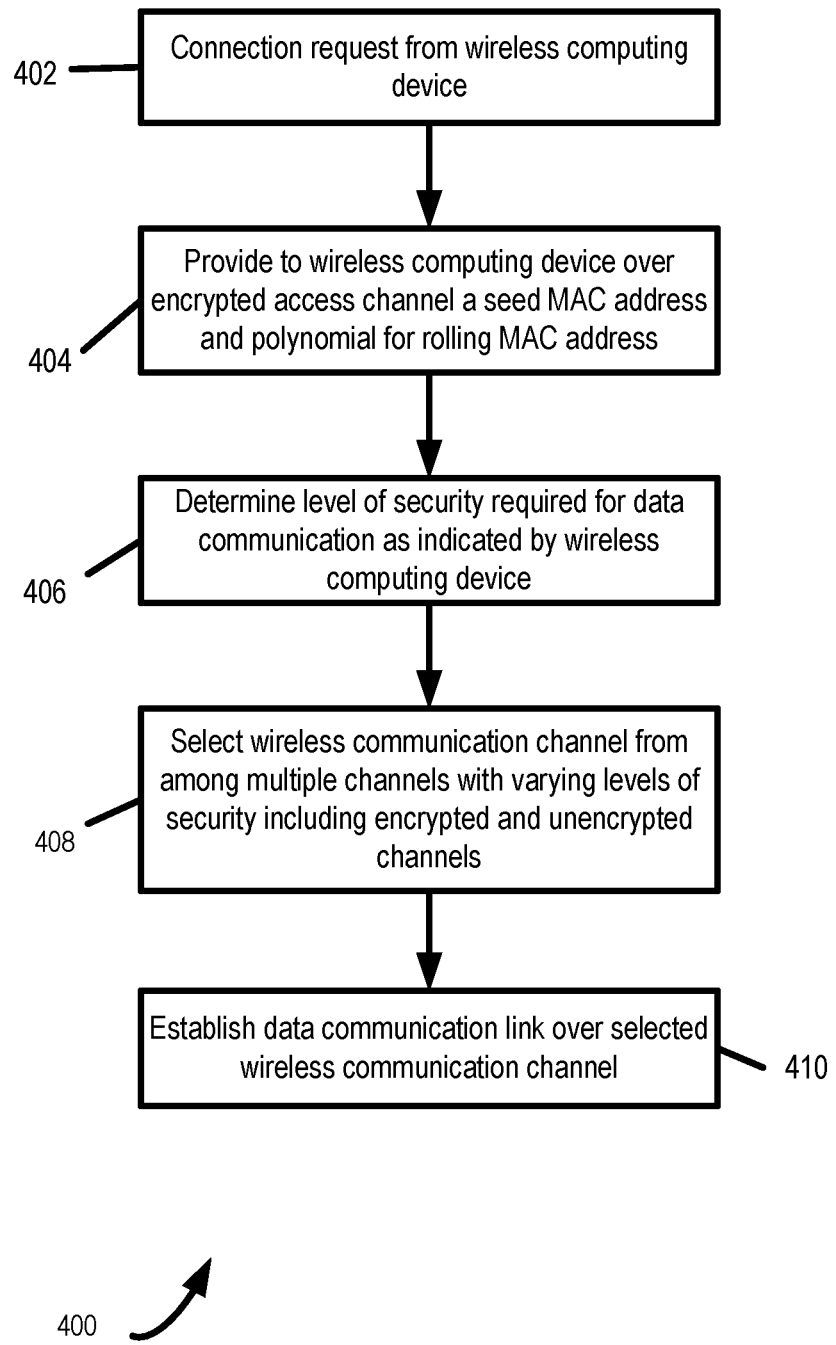
FIG. 4 is a flowchart illustrating a process for providing dynamic wireless link security according to some aspects of the present disclosure.

FIG. 4 depicts a flowchart illustrating, as an example, process 400 for providing dynamic wireless link security according to certain aspects. Process 400 of FIG. 4 is performed by wireless router 102 of FIG. 2. At block 402, wireless router 102 receives a connection request from a wireless computing device through antenna 110 via encrypted access channel 120. At block 404, processor 204 causes a seed MAC address and polynomial to be generated and provided to the wireless computing device over the encrypted access channel 120 using antenna 110. At block 406, processor 204 determines the level of security required for data communication. In some aspects, the level of security is indicated by a channel or security level identification received from the wireless computing device over encrypted access channel 120. At block 408, wireless router 102, controlled by processor 204, selects the appropriate wireless communication channel from among multiple channels with varying levels of security. The channels available in this example include encrypted channel 124 and unencrypted channel 122. However, other channels can be provided. Encrypted access channel 120 can also be used for the wireless data communication link, in which case wireless router 102 directs the wireless computing device to send traffic on access channel 120, which is already in use for setting up the wireless link. At block 410, the data communication link is established over the selected wireless communication channel so that wireless router 102 can exchange data with the wireless computing device.

Prior to transmission of data the wireless computing device can inspect metadata for the content to be transmitted in order to dynamically determine which channel or security level to use. In some aspects, the level of security is indicated to the wireless access point by a channel or security level identification sent by the wireless computing device over the encrypted access channel. For example, if a word processing document is already encrypted, and a sending application can know that the user is requesting a highly secure transmission, a decision can be made to send the document over the unencrypted channel because the combination of the content security and the channel security meets the total security requirement. The unencrypted channel can also be used when the sending application detects the use of https or a virtual private network (VPN) secure tunnel. All such data exchange would then be done without the processing delay of a strongly encrypted wireless communication channel. Other information might not already be encrypted, but may not need to be encrypted because it is low sensitivity information, for example, public Web content that is open for anyone to view. In this case, the unencrypted channel can again be used, but the access control is still managed via the encrypted access channel, and the rolling MAC address ensures no unauthorized device is able to use the unencrypted channel. Access control can be maintained, but without sacrificing performance or throughput.

Endpoint devices in certain aspects may have four classes of information to be transmitted: unencrypted information that does not need encryption; unencrypted information that does need encryption; encrypted information that does not need additional encryption; and unencrypted or lightly encrypted information that requires some degree of additional encryption. The information class can be known to the wireless computing device. The wireless computing device then determines and directs which type of information is to be sent or which wireless communication channel to use. The output of all channels is aggregated into a common stream in the wireless router or wireless access point for further transmission to the ISP or other endpoint. It is also possible to overlay a channel hopping scheme over the dynamic wireless link security described herein to achieve a low probability of intercept (LPI) as compared to using only the encryption and rolling MAC address security features discussed above.

Figure 5:
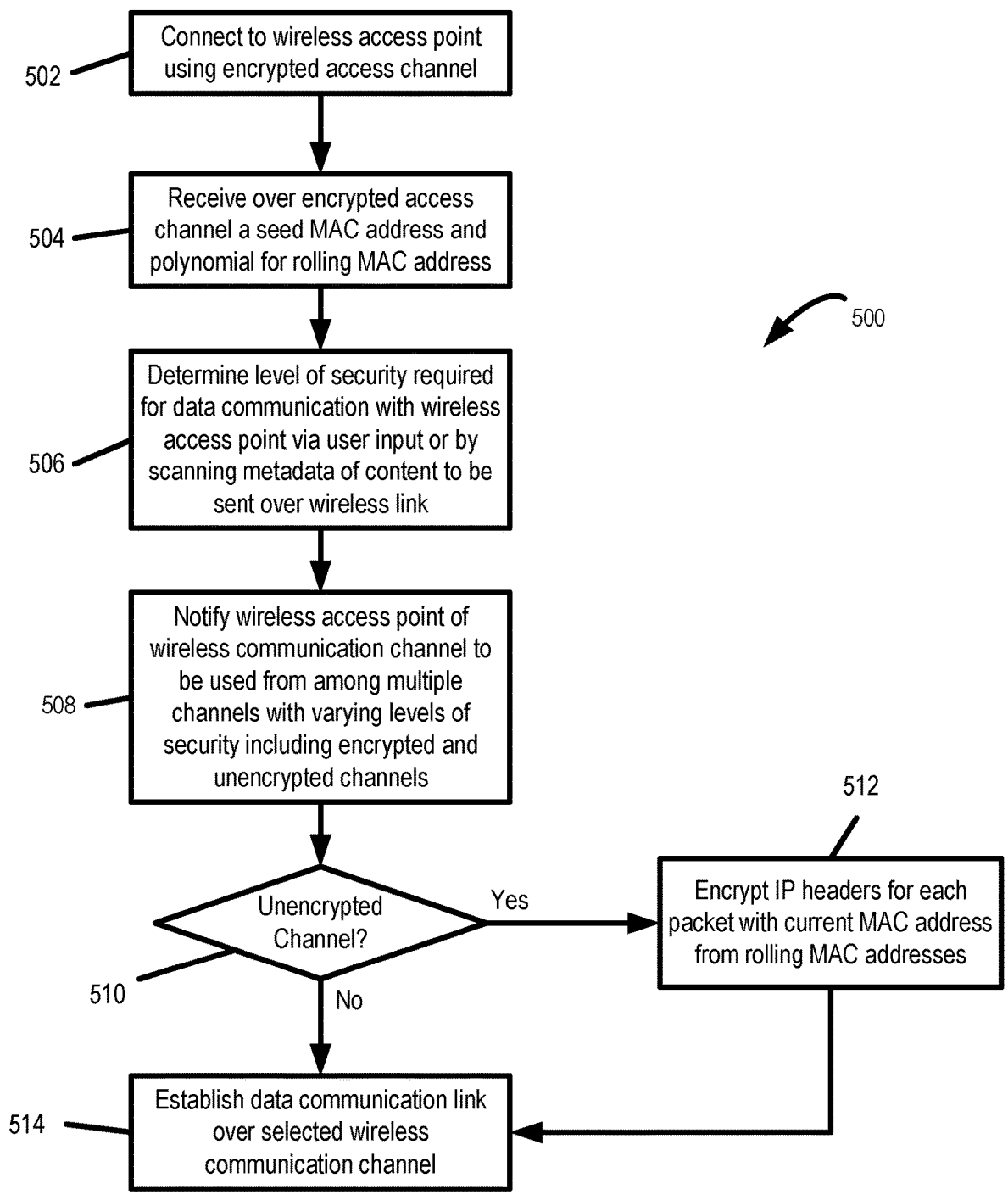
FIG. 5 is a flowchart showing the operation of a wireless computing device implementing dynamic wireless link security according to some aspects of the present disclosure.

FIG. 5 depicts a flowchart showing the operation of wireless computing device 116 connecting to a wireless network using dynamic wireless link security according to some aspects. At block 502 of process 500, wireless computing device 116 connect to a wireless access point using an encrypted access channel. At block 504, wireless computing device 116 receives over the access channel a seed MAC address and a polynomial for rolling MAC addresses. At block 506, processor 303 determines that level of security required for data communication with the wireless access point via user input or by scanning metadata of content to be sent over the wireless link. If user input is used, it can be received through tactical and visual I/O block 312. In some aspects, it is received after a prompt is presented to the user by the operating system or an app that is used to manage dynamic wireless link security as described herein. At block 508, wireless computing device 116 notifies the wireless access point of the wireless communication channel to be used from among multiple channels with varying levels of security including encrypted and unencrypted channels.

Still referring to FIG. 5, if an unencrypted channel is selected at block 510, wireless computing device 116 at block 512 encrypts IP headers for each packet with the current MAC address from a series of rolling MAC addresses. If an encrypted channel is used, either the access channel or another encrypted channel, separate IP header encryption is not required, however, the rolling MAC addresses are still used for access control. In either case, the data communication link is established over the selected wireless communication channel at block 514.

Unless specifically stated otherwise, throughout this specification terms such as "processing," "computing," or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The foregoing description of the examples, including illustrated examples, of the subject matter has been presented only for the purpose of illustration and description and is not intended to be exhaustive or to limit the subject matter to the precise forms disclosed. Numerous modifications, adaptations, and uses thereof will be apparent to those skilled in the art without departing from the scope of this subject matter. The illustrative examples described above are given to introduce the reader to the general subject matter discussed here and are not intended to limit the scope of the disclosed concepts.

The invention claimed is:

1. A system comprising:
   a wireless local area network interface;
   a processor communicatively coupled to the wireless local area network interface, wherein the processor is configured to perform operations comprising:
   connecting to a wireless computing device using an encrypted channel from among a plurality of simultaneous wireless communication channels with varying levels of security;
   determining a level of security required for a data communication link between the wireless local area network interface and the wireless computing device;
   selecting a wireless communication channel corresponding to the level of security required from among the plurality of simultaneous wireless communication channels with varying levels of security, wherein the plurality of simultaneous wireless communication channels comprises an unencrypted channel with access control along with the encrypted channel;
   providing a seed media access control (MAC) address to the wireless computing device over the encrypted channel;
   providing a polynomial to the wireless computing device over the encrypted channel, the polynomial configured to enable rolling the seed MAC address to a current MAC address from a series of MAC addresses over time; and
   establishing the data communication link over the wireless communication channel using the current MAC address and the wireless local area network interface.

2. The system of claim 1 wherein the level of security is determined by receiving an identification of the level of security from the wireless computing device.

3. The system of claim 1 wherein the operations further comprise directing the wireless computing device to the wireless communication channel using the encrypted channel.

4. The system of claim 1 wherein the access control comprises an encrypted internet protocol header based at least in part on the series of MAC addresses over time.

5. A method comprising:
   connecting to a wireless local area network access point using an encrypted channel from among a plurality of simultaneous wireless communication channels with varying levels of security;
   determining a level of security required for a data communication link to the wireless local area network access point;
   selecting a wireless communication channel corresponding to the level of security required from among the plurality of simultaneous wireless communication channels with varying levels of security, wherein at least one of the plurality of simultaneous wireless communication channels is an unencrypted channel with access control;
   receiving a seed media access control (MAC) address over the encrypted channel;
   receiving a polynomial over the encrypted channel, the polynomial configured to enable rolling the seed MAC address to a current MAC address from a series of MAC addresses over time; and
   establishing the data communication link over the wireless communication channel using the current MAC address.

6. The method of claim 5 wherein the level of security is determined by receiving user input selecting the level of security.

7. The method of claim 5 wherein the level of security is determined at least in part by scanning metadata of content to be sent over the wireless communication channel.

8. The method of claim 5 further comprising receiving an identification of the wireless communication channel over the encrypted channel.

9. The method of claim 5 wherein the access control comprises an encrypted internet protocol (IP) header based at least in part on the series of MAC addresses over time.

10. A non-transitory computer-readable medium that includes instructions that are executable by a computing device for causing the computing device to perform operations for accessing a wireless network, the operations comprising:
    connecting to a wireless local area network access point using an encrypted channel from among a plurality of simultaneous wireless communication channels with varying levels of security;
    determining a level of security required for a data communication link to the wireless local area network access point;
    selecting a wireless communication channel corresponding to the level of security required from among the plurality of simultaneous wireless communication channels with varying levels of security, wherein at least one of the plurality of simultaneous wireless communication channels is an unencrypted channel with access control;
    receiving a seed media access control (MAC) address over the encrypted channel;
    receiving a polynomial over the encrypted channel, the polynomial configured to enable rolling the seed MAC address to a current MAC address from a series of MAC addresses over time; and
    establishing the data communication link over the wireless communication channel using the current MAC address.

11. The non-transitory computer-readable medium of claim 10 wherein the level of security is determined by receiving user input selecting the level of security.

12. The non-transitory computer-readable medium of claim 10 wherein the level of security is determined at least in part by scanning metadata of content to be sent over the wireless communication channel.

13. The non-transitory computer-readable medium of claim 10 wherein the instructions further comprise receiving an identification of the wireless communication channel over the encrypted channel.

14. The non-transitory computer-readable medium of claim 10 wherein the access control comprises an encrypted internet protocol (IP) header based at least in part on the series of MAC addresses over time.

\* \* \* \* \*